(12) United States Patent
Boldrini

(10) Patent No.: US 10,583,947 B2
(45) Date of Patent: Mar. 10, 2020

(54) METHOD AND APPARATUS FOR FILLING CAPSULES WITH LOOSE MATERIAL AND FOR THEIR SEALING

(71) Applicant: G.D S.p.A., Bologna (IT)

(72) Inventor: Fulvio Boldrini, Ferrara (IT)

(73) Assignee: G.D S.P.A., Bologna (IT)

( * ) Notice: Subject to any disclaimer, the term of this patent is extended or adjusted under 35 U.S.C. 154(b) by 514 days.

(21) Appl. No.: 14/366,238

(22) PCT Filed: Dec. 17, 2012

(86) PCT No.: PCT/IB2012/057395
§ 371 (c)(1),
(2) Date: Jun. 17, 2014

(87) PCT Pub. No.: WO2013/093763
PCT Pub. Date: Jun. 27, 2013

(65) Prior Publication Data
US 2015/0203229 A1    Jul. 23, 2015

(30) Foreign Application Priority Data
Dec. 20, 2011   (IT) ............................... B02011A0735

(51) Int. Cl.
*B65B 43/52*   (2006.01)
*B65B 1/04*   (2006.01)
(Continued)

(52) U.S. Cl.
CPC ............... *B65B 43/52* (2013.01); *B65B 1/04* (2013.01); *B65B 7/285* (2013.01); *B65B 65/003* (2013.01);
(Continued)

(58) Field of Classification Search
CPC ............ B65B 65/00; B65B 43/52; B65B 1/04; B65B 65/003; B65B 7/285; B65G 17/00; B65G 17/002; B65G 47/1471
(Continued)

(56) References Cited

U.S. PATENT DOCUMENTS 5,649,412 A  *  7/1997  Binacchi ................. B65B 9/023
                                                              426/77
6,190,617 B1     2/2001  Clark et al.
(Continued)

FOREIGN PATENT DOCUMENTS

EP           0780307 A1       6/1997
JP           S6219905          2/1987
(Continued)

OTHER PUBLICATIONS

Office Action issued by the Japanese Patent Office dated Aug. 2, 2016 for counterpart Japanese Application No. 2014-548291.
(Continued)

*Primary Examiner* — Chelsea E Stinson
*Assistant Examiner* — Mary C Hibbert-Copeland
(74) *Attorney, Agent, or Firm* — Shuttleworth & Ingersoll, PLC; Timothy J. Klima

(57) ABSTRACT

A method and an apparatus for filling capsules with loose material and for their sealing, in which the plates equipped with a plurality of housings designed to accommodate respective capsules are carried on after another, by conveyor devices, to a plurality of operating stations, at each of which the capsules relative to each plate are subjected to respective manipulations by at least one manipulating device; the plates being supported in a removable manner by the conveyor means, and at each operating station there being a device for locking the plates which can be activated by a management unit, for stopping at least one plate at a time at the operating
(Continued)

station for a predetermined time for it to be manipulated by at least one manipulating device and for releasing at least one plate at a time at the end of the manipulating of the at least one manipulating device.

14 Claims, 4 Drawing Sheets

(51) Int. Cl.
  *B65B 65/00* (2006.01)
  *B65B 7/28* (2006.01)
  *B65G 17/00* (2006.01)
  *B65G 47/14* (2006.01)
(52) U.S. Cl.
  CPC ........ *B65G 17/002* (2013.01); *B65G 47/1471* (2013.01)
(58) Field of Classification Search
  USPC ..... 53/471, 453, 420, 489, 558; 198/397.06; 156/479
  See application file for complete search history.

(56) References Cited

U.S. PATENT DOCUMENTS

| | | | |
|---|---|---|---|
| 2007/0028562 A1* | 2/2007 | Heil | B65B 43/52 53/398 |
| 2010/0178401 A1* | 7/2010 | Van Appeldoorn | A23L 3/0155 426/392 |
| 2010/0258404 A1* | 10/2010 | Warecki | B65B 5/103 198/339.1 |

FOREIGN PATENT DOCUMENTS

| | | |
|---|---|---|
| JP | H710109 | 1/1995 |
| WO | 2009079641 A2 | 6/2009 |

OTHER PUBLICATIONS

International Search Report and Written Opinion dated Mar. 12, 2013 from counterpart app No. PCT/IB2012/057395.

* cited by examiner

METHOD AND APPARATUS FOR FILLING CAPSULES WITH LOOSE MATERIAL AND FOR THEIR SEALING

This application is the National Phase of International Application PCT/IB2012/057395 filed Dec. 17, 2012 which designated the U.S. and that International Application was published under PCT Article 21(2) in English.

This application claims priority to Italian Patent Application No. BO2011A000735 filed Dec. 20, 2011, which application is incorporated by reference herein.

TECHNICAL FIELD

This invention relates to a method and an apparatus for filling capsules with loose material and for their sealing.

In particular, the method and the apparatus according to this invention can advantageously be used for filling with a viscous loose material containing tobacco, and subsequently for sealing, metal capsules which can be used together with devices designed to produce an aerosol able to supply a user with the sensation of smoking cigarettes or similar articles. Hereinafter reference will be made to that type of capsule and that type of filling material, without thereby limiting the scope of the invention.

BACKGROUND ART

Devices of that type are known, for example from patent application WO2009079641A2, in which a capsule containing a substance of the above-mentioned type, consisting of a tiny container for housing the substance and a container closing sheet, can be inserted in a special housing of the device, the sheet is pierced, and the capsule is heated so as to cause the vaporised substances intended to be inhaled to come out through the perforation made in the cover.

Prior art apparatuses for filling and sealing capsules of the above-mentioned type have relatively low operating speeds, and therefore are not considered very attractive by operators in the sector, who would like to have reliable apparatuses which can simultaneously guarantee a very high operating speed.

DISCLOSURE OF THE INVENTION

The aim of this invention is to provide a method and an apparatus for filling capsules with loose material and for their sealing which can guarantee a high operating speed and absolute reliability.

Accordingly, this invention provides a method and an apparatus for filling capsules with loose material and for their sealing as described herein.

BRIEF DESCRIPTION OF THE DRAWINGS

This invention will now be described with reference to the accompanying drawings which show a non-limiting example embodiment of it, in which.

DETAILED DESCRIPTION OF THE PREFERRED EMBODIMENTS OF THE INVENTION

Figure 4:
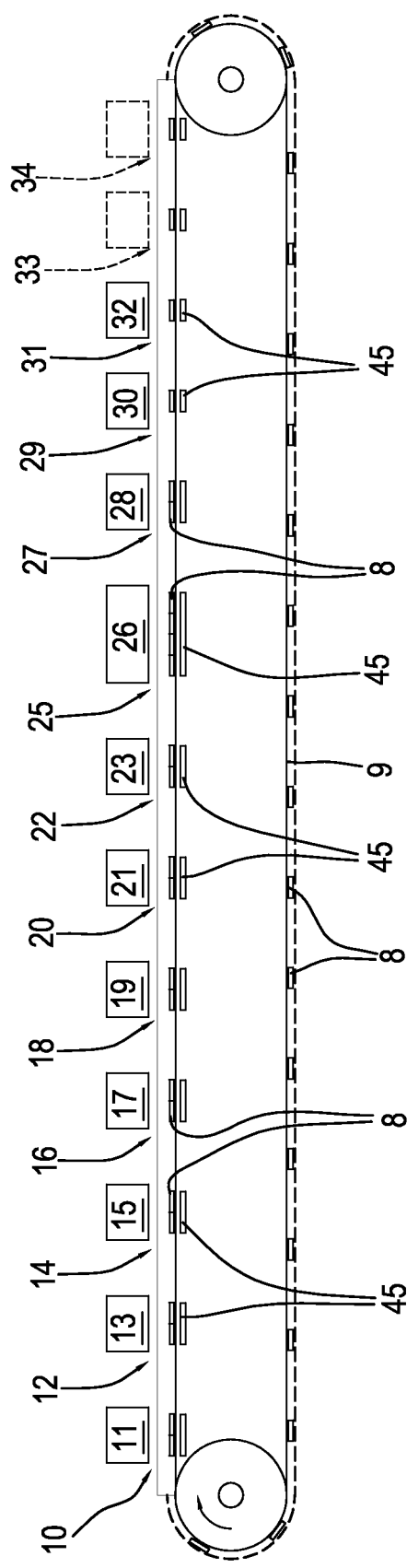
FIGS. 4 and 5 are respectively an elevation view and a plan view of the apparatus according to this invention.
Figure 5:
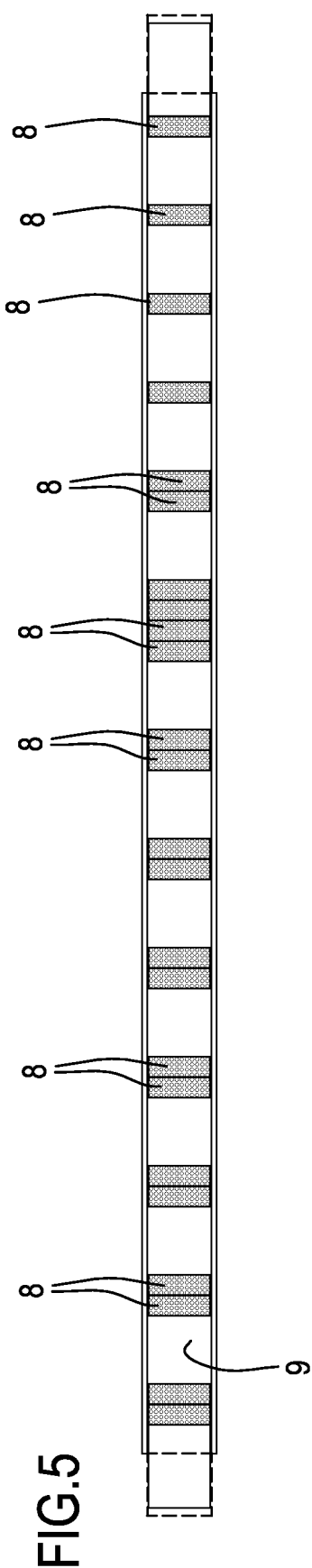

With reference in particular to FIGS. 4 and 5, the numeral 1 denotes in its entirety an apparatus for filling capsules 2 with loose material and for their sealing.

Figure 1:
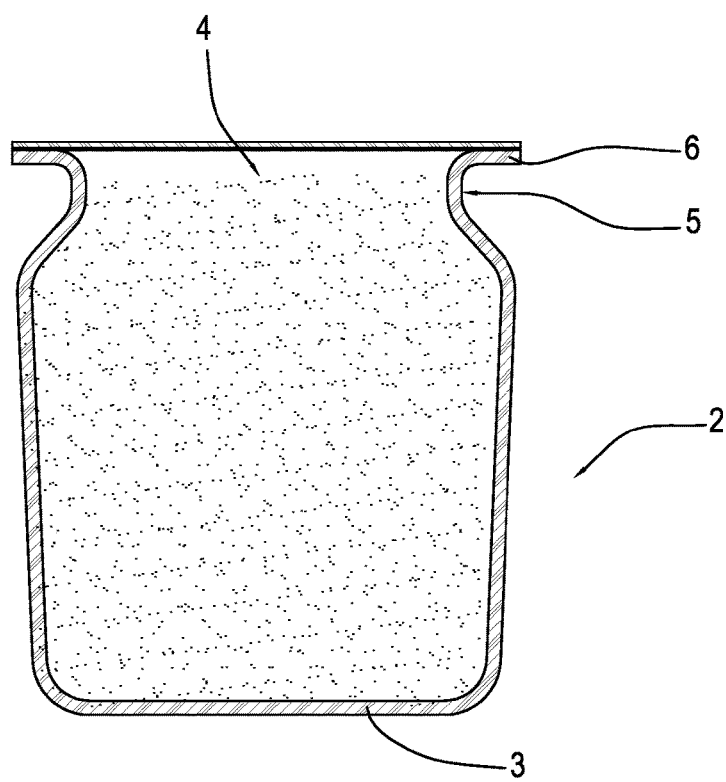
FIG. 1 is an axial section of a capsule which can be manipulated by the apparatus according to this invention.

The capsules 2 are made by moulding metal material, in particular aluminium or an aluminium alloy, and, as shown in FIG. 1, they have the shape of a substantially frustoconical hollow revolved solid, with a slight taper and the vertex at the base, closed at the bottom by a circular 3 base, equipped with a circular opening 4 at the top, and in an upper lateral zone having an annular narrowing 5, above which the hollow revolved solid projects radially outwards an edge wall 6 formed by a ring lying in a horizontal plane.

It should be noticed that the capsules 2 can be used to contain various types of materials, which may require different manipulations or dosing in order to be closed in the capsules 2.

In this apparatus 1, the capsules 2 are moved between the various processing operating stations, described below, after being inserted, with the respective openings 4 upwards, in respective vertical through housings 7 made in the transfer plates 8. More precisely, each plate 8 has, preferably and in the example illustrated in FIGS. 2 and 3, a substantially rectangular shape in plan view, and the housings 7 are arranged in the plate 8 in several parallel rows (four rows of twelve housings in the plate 3 shown by way of example). The housings 7 have a size and substantially frustoconical shape matching those of the lower portion of the capsules 2, so that the capsules 2 inserted in the housings 7 rest with their lateral surface against that of the housings 7 and are therefore perfectly supported and positioned.

Figure 2:
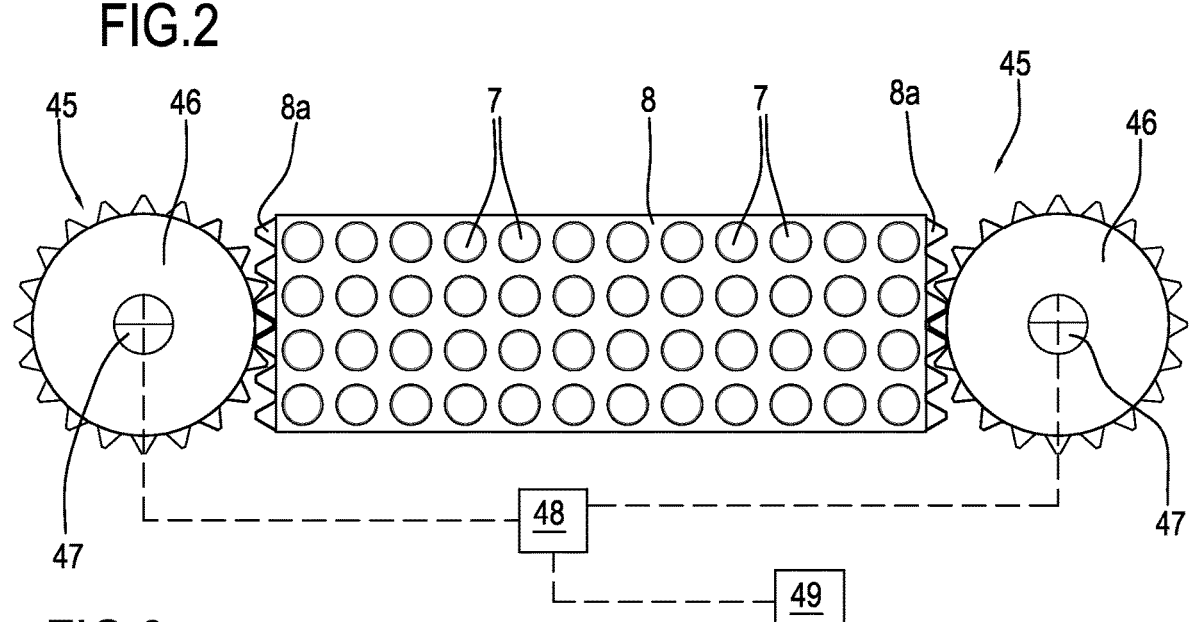
FIGS. 2 and 3 are respectively a plan view and a cross-section of a plate designed to support a plurality of capsules of the type illustrated in FIG. 1.
Figure 3:
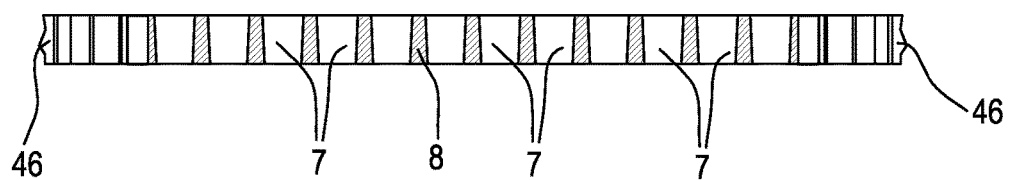

As shown in FIG. 2, each of the shorter sides of the plates 8 is equipped, for reasons that are described in more detail below, with toothing or a rack 8a designed to engage with a gear wheel 46 with vertical axis.

The apparatus 1, in a complete schematic embodiment of it, shown in FIGS. 4 and 5 and designed to fill capsules 2 which involves performing a relatively very large number of possible manipulations and operations, comprises:

conveyor means comprising a belt conveyor 9 able to move with continuous motion, looped around two end rollers having horizontal axes, comprising a horizontal conveying surface and designed to cyclically convey one after another, according to predetermined criteria described in more detail below, the plates 8 containing the capsules 2 in the respective housings 7 close to a series of operating stations; the plates 8 resting in a removable fashion on the belt conveyor 9 with their main direction of extension positioned horizontally and perpendicular to the direction of transport of the belt conveyor 9;

a first operating station 10 comprising a device 11 (of the known type) for feeding capsules 2 positioned in an orderly way and with the opening 4 upwards, into the housings 7 of the plates 8;

a second operating station 12 (of the known type, which could even coincide with the third operating station 14) comprising a device 13 for feeding loose material into the capsules 2 supported by the plates 8, inserting said material through the upper openings 4 in the capsules 2;

a third operating station 14 (of the known type, which for certain types of loose materials could even be missing and which could even coincide with the second operating station 12) comprising a device 15 for spreading and homogenisation of the upper portion of loose material inserted in the capsules 2;

a fourth operating station 16 (of the known type, which could even coincide with the third operating station 14) comprising a device 17 for compressing the upper portion of loose material inserted in the capsules 2;

a fifth operating station 18 (of the known type, which could even coincide with the fourth operating station 16) comprising a cleaning device 19 for removing any traces of loose material from the upper surface of the edge walls 6 of the filled capsules 2;

a sixth operating station 20 comprising a weighing device 2 (of the known type) for the filled capsules 2;

a seventh operating station 22 comprising a device 23 (of the known type) for feeding a circular sheet 24 above the edge wall 6 of each filled capsule 2; the sheets 24 usually being obtained by cutting them from a band of aluminium or an aluminium alloy which, as indicated in the above-mentioned patent application WO2009079641A2, could also have a surface coated with a thin layer of plastic material;

an eighth operating station 2 (which could even coincide with the station 22) comprising a sealing device 26 (of the known type and operating, for example, by induction or pulses) for sealing a circular sheet 24 on top of the edge wall 6 of each filled capsule 2;

a ninth operating station 27 comprising a device 28 (of the known type) for checking the hermetic seal of the filled and sealed capsules 2;

a tenth operating station 29 comprising a device 30 (of the known type) for rejecting any capsules 2 which are faulty due to an error in the weight of the loose material contained in them or the lack of a hermetic seal;

an eleventh operating station 31 comprising an extractor device 32 (of the known type) for removing the sealed capsules 2 from the housings 7 of each plate 8;

a twelfth operating station 33 (of the known type, which could even be missing) for compacting, realigning and regrouping the capsules 2 extracted from the housings 7 of the plates 8, designed to then feed the capsules 7 towards a packaging apparatus (not illustrated): or a thirteenth operating station 34 (of the known type, alternative to the twelfth operating station 33) for putting into a mass the capsules 2 extracted from the housings 7 of the plates 8.

In the following description, at times brief information is provided about the operating devices at the above-mentioned operating stations. The purely indicative nature of said descriptions arises from the fact that said devices could be of any known type designed to perform the required task, since the essence of this invention is not the methods used by the devices, but the way in which the devices are made to operate with reference to the capsules 2 supported by the plates 8 and the methods with which the plates 8 are conveyed and manipulated.

Figure 6:
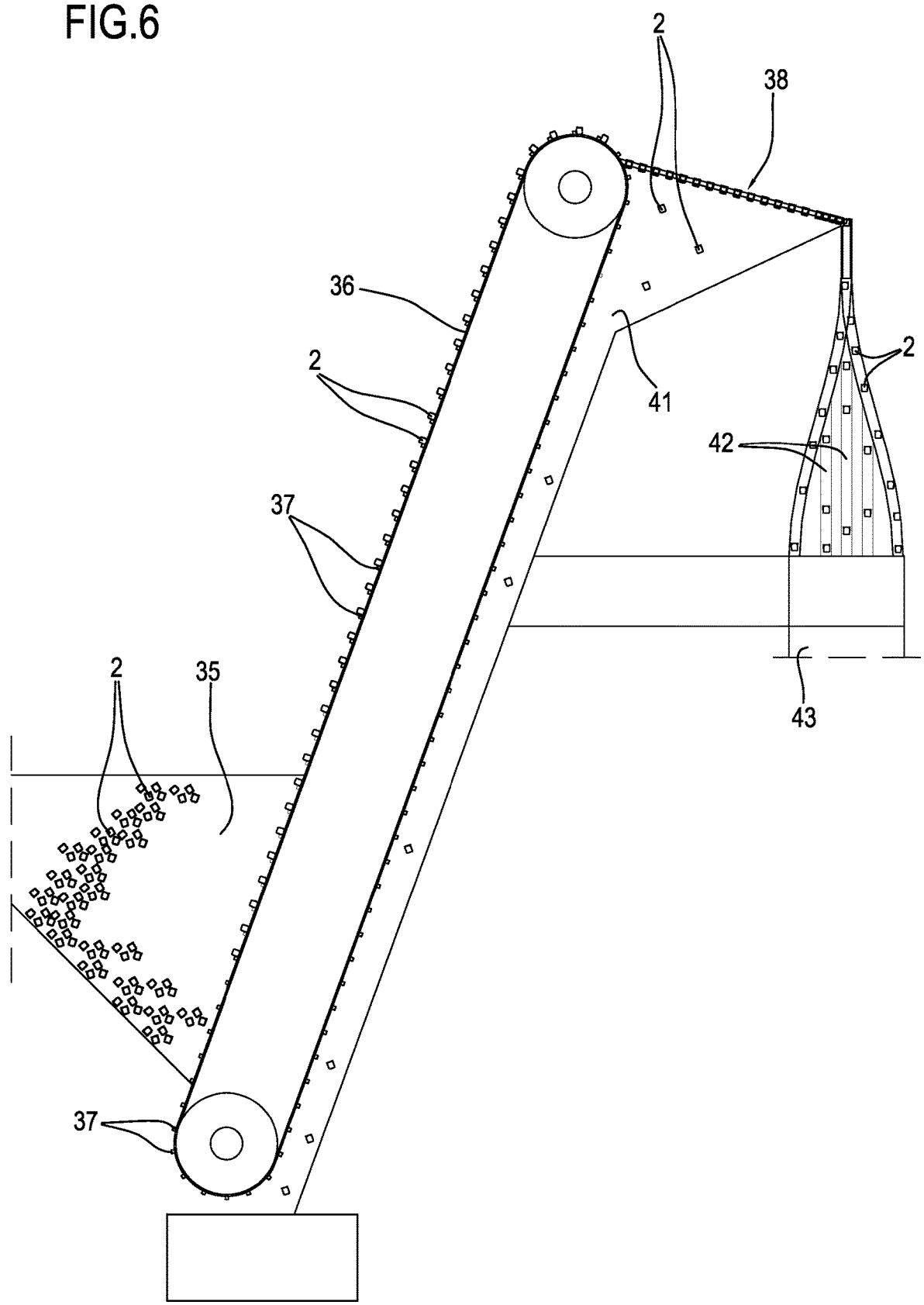
FIG. 6 is a schematic elevation view of a portion of the apparatus of FIGS. 4 and 5.

In the embodiment schematically illustrated by way of example in FIG. 6, the device 11 for feeding capsules 2 into the housings 7 of the plates 8, operating at the first operating station 10, comprises a hopper 35 for containing empty capsules 2 arranged in a loose fashion, the right side of which is drawn near to the ascending conveying branch of a belt conveyor 36 directed upwards and to the right in FIG. 6. The conveying surface of said belt conveyor 36 is equipped with a plurality of transversal ribs 37 designed to engage with the capsules 2 contained in the hopper 35 and positioned in contact with the belt conveyor 36, so as to retain a predetermined quantity of capsules and convey them, upwards.

Figure 8:
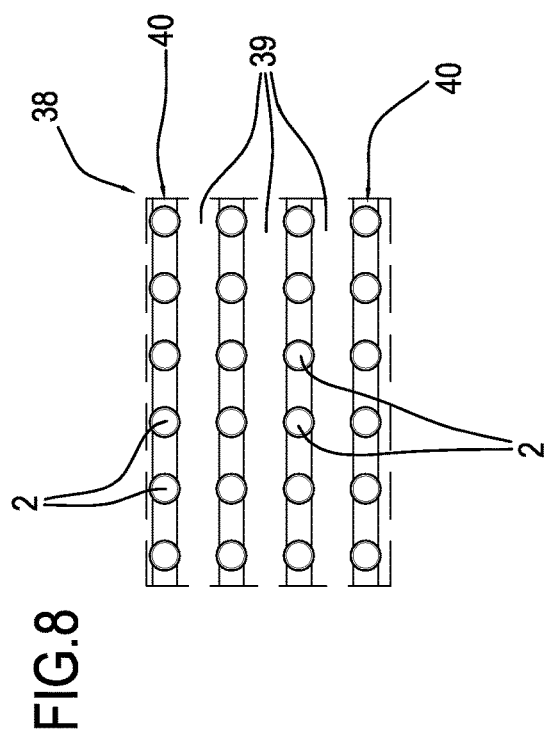
FIGS. 7 and 8 are two up views of details of the portion of the apparatus of FIG. 6.
Figure 7:
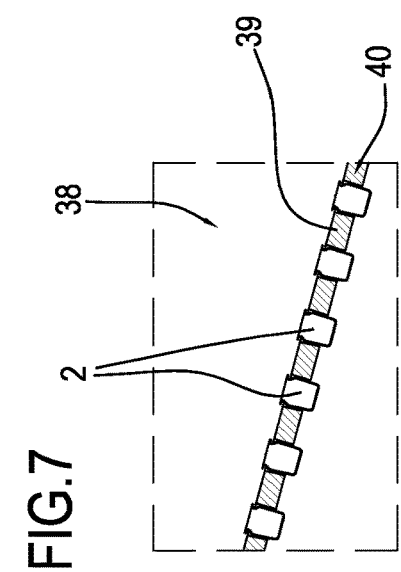

Drawn near to an upper end portion of the belt conveyor 36 positioned on the opposite side to the hopper 35 and on the right in FIG. 6, there is a first end (left in FIG. 6) of a chute 38, extending away from the belt conveyor 36, the second end being positioned at a lower level than that of the first end. The chute 38 is formed (FIG. 8) by a plurality of strips 39 which are parallel with each other and drawn near one another in pairs to form, in the longitudinal direction of extension of the chute 38, a number of angled passages 40 (FIG. 7) extending between the two ends of the chute 38 and having a width just greater than the diameter of the annular narrowing 5 of the capsules 2 but less than the diameter of their edge walls 6. The number of said passages 40 is equal to that of the housings 7 of a plate 8.

Positioned below the chute 38 there is a collector 41, designed to receive the faulty capsules 2 (for example crushed or undersized) which, due to their reduced size, have managed to pass between two adjacent strips 39 and, therefore, dropped from the chute 38.

The second end of the chute 38 opens out above the inlets, positioned alongside one another, of a plurality of channels 42 which extend downwards, their number equal to that of the housings 7 of a plate 8. The arrangement of the lower outfeed ends of the channels 42 is the same as that of the housings 7 of a plate 8, and the channels 42 can simultaneously release, after activation of an interceptor device of the known type schematically illustrated as a block 43, a number of capsules 2 equal to that of the housings 7 of a plate 8. The feed device 11 described, operating at the first operating station 10, can insert capsules 2 in all of the housings 7 of the plates 8 which, as is more apparent below, in use are brought one after another under the lower outfeed ends of the channels 42.

In the embodiment of this invention shown in FIG. 4, the devices 13, 15, 17, 19, respectively provided for feeding loose material into the capsules 2 supported by the plates 8, for spreading and homogenising the upper portion of the loose material inserted in said capsules 2, for compressing the upper portion of the loose material inserted in the capsules 2 and for removing any traces of loose material from the upper surface of the edge walls 6 of the filled capsules 2, operating, as already indicated, at respective operating stations 12, 14, 16 and 18, are all of the known type and therefore are not described. Similarly, as indicated, the devices 21, 23, 26, 28, 30 and 32 are also of the known type and are not described.

As shown in FIG. 4, along the path followed by the horizontal upper conveying branch 44 of the belt conveyor 9, the above-mentioned operating stations 10, 12, 14, 16, 18, 20, 22, 25, 27, 29, 31 are located and one of the stations 33, 34, suitably spaced out.

At each of said operating stations 10, 12, 14, 16, 18, 20, 22, 25, 27, 29, 31 and 33 or 34 there is a device 45 for locking the plates 8 conveyed by the horizontal conveying branch 44 of the belt conveyor 9.

As shown in FIG. 2, each locking device 45 comprises two gear wheels 46 with vertical axes, positioned on opposite sides of the belt conveyor 9 and keyed on respective shafts 47 connected to motor means 48 designed to impart a rotating motion to the shafts 47, rotating them in opposite directions controlled by a computerised management unit 49. The gear wheels 46 of each locking device 45 are respectively designed to engage with the toothing 8a present on the smaller sides of the plates 8 supporting the capsules 2 when said plates, carried by the belt conveyor 9 on which they rest, reach the gear wheels 46.

More precisely, when a plate 8 carried by the belt conveyor 9 reaches one of the above-mentioned operating stations 10, 12, 14, 16, 18, 20, 22, 25, 27, 29, 31, 33, 34, the arrival of the plate 8 is detected by suitable sensors of the known type and not shown, and the management unit 49 consequently activates the motor means 48 relative to the two gear wheels 46 associated with the operating station. Said gear wheels 46 then engage with the sides of the plate 8 equipped with the toothing 8a, preferably rotating with a speed such that said engagement is performed without altering the speed of movement of the plate 8, and they stop at the precise moment when the plate 8 must stop so that the capsules 2 it is carrying can be subjected to the relevant operations in the operating station. The plate 8 remains at that operating station, the relative gear wheels 46 being stationary, for the time needed for the capsules 2 transported by it to be subjected to the required operations. The subsequent restarting of the motor means 48 relative to the gear wheels 46 in question causes the immediate continuation of plate 8 feed, since the plate 8, released from the action of the locking device 45, is again subject to the feeding action of the belt conveyor 9 on which it rests.

It should be noticed that the operations which must be performed at the operating stations 10, 12, 14, 16, 18, 20, 22, 25, 27, 29, 31, 33 or 34 by the manipulating devices consisting of the devices 11, 13, 15, 17, 19, 21, 23, 26, 28, 30, 32 and the devices operating at the operating stations 33 and 34 do not all take the same amount of time. In particular, for example, the sealing operation performed by the sealing device 26 to seal a circular sheet 24 over the edge wall 6 of each filled capsule 2 takes a relatively long time, and in any case longer than the time needed for the action of devices 11, 13, 15, 17, 19, 21, 23, 25 and 26 and much longer than the time necessary for the action of devices 28, 29, 30, 32 and of those operating at the operating stations 33 and 34. In light of that, to speed up the apparatus 1 as much as possible, making the best use of the operating time of the various devices 11, 13, 15, 17, 19, 21, 23, 26, 28, 30, 32 and of those operating at the operating stations 33 and 34, and using optimised plate 8 stay times at the operating stations 10, 12, 14, 16, 18, 20, 22, 25, 27, 29, 31, 33 or 34, according to this invention the number of plates 8 which arrive at the various operating stations 10, 12, 14, 16, 18, 20, 22, 25, 27, 29, 31, 33 or 34 to subject the relative capsules 2 to the corresponding treatments is not the same for all of the operating stations 10, 12, 14, 16, 18, 20, 22, 25, 27, 29, 31, 33 or 34. In that way, the operating stations associated with slower devices can simultaneously treat a number of plates 8 greater than that of the operating stations associated with faster acting devices. For example, as shown in FIGS. 4 and 5, in the operating stations 10, 12, 14, 16, 18, 20, 22 and 27 groups of two plates 8 are treated, in the operating station 25 groups of four plates 8 are treated, and in the operating stations 29, 31, 33 or 34 one plate 8 at a time is treated.

The accumulation of groups consisting of more than one plate 8 at the operating stations 16, 18, 20, 22, 25 and 27 is performed by blocking the first plate 8 of each group in a suitable position using the gear wheels 46 of the respective locking device 45, and then holding still said plate 8 for the time necessary for the arrival of the subsequent plate or plates in the group, as well as for the time needed to subject the capsules 2 supported by the plate or plates to the operation designed to take place in the respective operating station 16, 18, 20, 22, 25 and 27. Restarting the gear wheels 46 which stopped and retained a plate 8 or a group of plates 8 causes disengagement of the respective locking device 45 from the plate or plates 8 and said plates 8, one at a time and in the appropriate number, continue on their journey towards the next operating station 10, 12, 14, 16, 18, 20, 22, 25, 27, 29, 31, 33 or 34.

In other words, and more generally, according to the ideas expressed above at least one plate 8 at a time is stopped at each operating station 10, 12, 14, 16, 18, 20, 22, 25, 27, 29, 31, 33, 34 for a predetermined time so that it can be subjected to the action of at least one manipulating device 11, 13, 15, 17, 19, 21, 23, 26, 28, 30, 32 and at least one plate at a time is moved away from the operating station 10, 12, 14, 16, 18, 20, 22, 25, 27, 29, 31, 33, 34 upon completion of the action of the at least one manipulating device 11, 13, 15, 17, 19, 21, 23, 26, 28, 30, 32; and the number of plates 8 which are stopped in each operating station 10, 12, 14, 16, 18, 20, 22, 25, 27, 29, 31, 33, 34, or respectively moved away from the operating station 10, 12, 14, 16, 18, 20, 22, 25, 27, 29, 31, 33, 34 at each operating step of the respective manipulating device 11, 13, 15, 17, 19, 21, 23, 26, 28, 30, 32 is different relative to at least some of the operating stations 10, 12, 14, 16, 18, 20, 22, 25, 27, 29, 31, 33, 34.

As shown in FIG. 4, the plates 8 which have moved past the operating station 12 or the operating station 13, that is to say, from which the capsules 2 that underwent the necessary manipulations have been unloaded, are returned one after another towards the infeed of the belt conveyor 9, for example by making them pass (in the known way) under the belt conveyor 9, driven by the action of a conveyor device.

It should be noticed that the locking devices 45 could be of any type, and that the embodiment comprising the gear wheels 46 and the toothing or racks 8a of the plates 8 was described and illustrated by way of example only.

Figure 9:
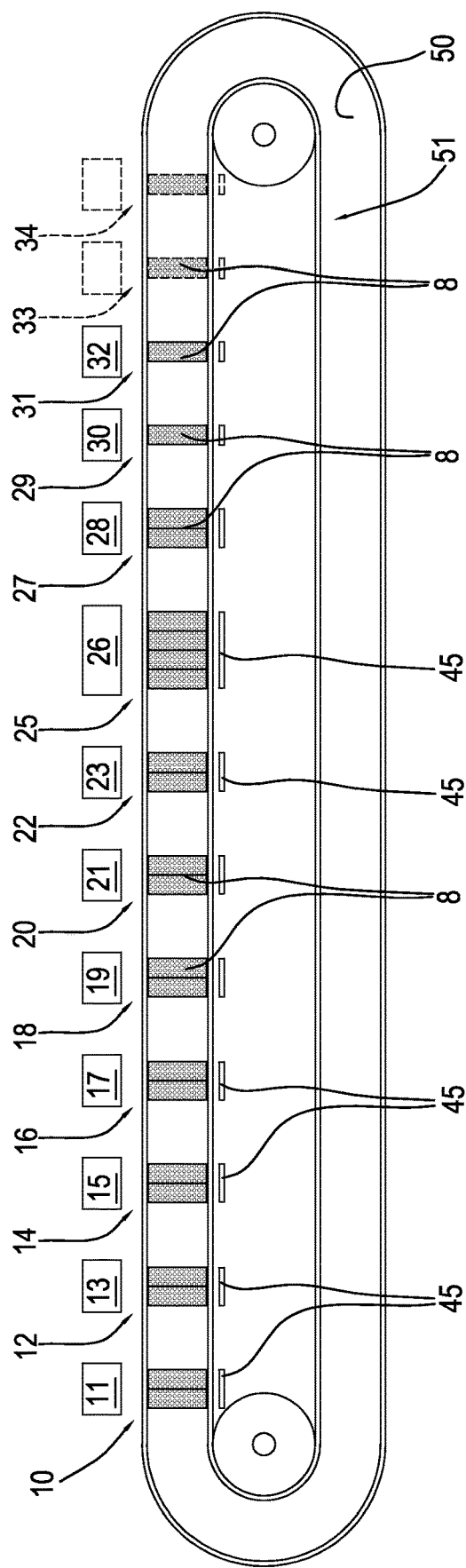
FIG. 9 illustrates an alternative embodiment of the apparatus of FIG. 4.

FIG. 9 is a schematic illustration of an alternative embodiment of the apparatus 1, in which the belt conveyor 9 looped around two rollers with horizontal axes is substituted with an annular conveyor 50, comprising a conveying surface 51 which lies entirely in a horizontal plane. The annular conveyor 50 is laterally flexible and extends around two supports (not illustrated) which are able to rotate about respective vertical axes.

Associated with a conveying branch of said annular conveyor 50 there are the operating stations 10, 12, 14, 16, 18, 20, 22, 25, 27, 29, 31, 33 or 34, which are respectively associated with the above-mentioned devices 11, 13, 15, 17, 19, 21, 23, 26, 28, 30, 32 and those operating at the operating stations 33 and 34, and operation of the apparatus 1 using said annular conveyor 50 is the same as that of the apparatus 1 using the belt conveyor 9 described.

It should be noticed that in place of the belt conveyor 9 or the annular conveyor 50 a conveyor of any other type could be used in which the plates 8 rest and can stop, when necessary and for a suitable time, under the action of locking devices able to retain them at various types of operating stations.

The invention claimed is:

1. A method for filling capsules with loose material and for sealing the capsules, comprising:
   carrying a plurality of plates in succession through a plurality of operating stations with a single conveyor, the plurality of plates including a plurality of housings accommodating relative capsules, at each of the plurality of operating stations, subjecting the capsules relative to each plate to respective manipulations by at least one manipulating device, stopping at least one plate at a time at each operating station for a predetermined time for manipulation of the capsules by at least one manipulating device, maintaining the at least one plate in the same position for the entire predetermined time for manipulation of the capsules, and moving the at least one plate at a time away from the operating station at an end of the manipulation by the at least one manipulating device;

wherein a number of plates stopped in, and moved away from each of the operating stations is different than a number of plates stopped in, and moved away from at least another of the operating stations such that at least one of the operating stations, which includes a slower manipulating device, simultaneously manipulates a number of plates greater than a number of plates simultaneously manipulated, at a same time, by at least another one of the operating stations including a faster manipulating device, and that in the at least one of the operating stations, which includes the slower manipulating device, the number of plates stopped in the operating station, and moved away from the operating station, is greater than the number of plates simultaneously stopped in, and moved away from the at least another one of the operating stations including the faster manipulating device.

2. The method according to claim 1, and further comprising:

supporting the plates in a removable manner by the conveyor, and providing at each operating station a locking device for locking the plates, which can be activated by a management unit, for stopping at least one plate at a time at the operating station for a predetermined time for manipulation of the capsules and for releasing at least one plate at a time at the end of the manipulation of the capsules.

3. The method according to claim 2, wherein, the number of plates which are stopped by the locking devices at various of the operating stations for subjecting the relative capsules to the manipulations is not the same for all the operating stations to accommodate different time durations for different manipulations performed at different operating stations.

4. The method according to claim 1, and further comprising:

accumulating a group of more than one plate at at least one of the operating stations by stopping in an appropriate position a first plate of the group using a locking device, and then keeping the plate stationary for a time necessary for arrival of at least one further plate of the group, as well as for a time necessary for performance of an operation occurring in the at least one of the operating stations on the capsules supported by plates in the group.

5. The method according to claim 4, and further comprising:

disengaging the locking device to resume moving of the plates, one at a time and in an appropriate number, towards a next operating station.

6. The method according to claim 5, wherein, after the capsules have undergone all manipulations, the capsules are discharged from the plates and then the plates are transported back in succession towards an infeed area of the conveyor.

7. The method according to claim 1, wherein, after the capsules have undergone all manipulations, the capsules are discharged from the plates and then the plates are transported back in succession towards an infeed area of the conveyor.

8. A method for filling capsules with loose material and for sealing the capsules, comprising:

carrying a plurality of plates in succession through a plurality of operating stations with a single conveyor, the plurality of plates including a plurality of housings accommodating relative capsules, at each of the plurality of operating stations, subjecting the capsules relative to each plate to respective manipulations by at least one manipulating device, stopping at least one plate at a time at each operating station for a predetermined time for manipulation of the at least one plate by at least one manipulating device, maintaining the at least one plate in the same position for the entire predetermined time for manipulation if the at least one plate, and moving the at least one plate at a time away from the operating station at the end of the manipulation by the at least one manipulating device;

at at least one of the operating stations, stopping and moving away at a time a first number of plates, where the first number of plates is more than one and is different from a second number of plates stopping and moving away at a time from at least another one of the operating stations and simultaneously with the stopping and moving away said first number of plates at the at least one of the operating stations such that at least one of the operating stations, which includes a slower manipulating device, simultaneously manipulates a number of plates greater than a number of plates simultaneously manipulated, at a same time, by at least another one of the operating stations including a faster manipulating device, and that in the at least one of the operating stations, which includes the slower manipulating device, the number of plates stopped in the operating station, and moved away from the operating station, is greater than the number of plates simultaneously stopped in, and moved away from, the at least another one of the operating stations including the faster manipulating device.

9. The method according to claim 8, and further comprising:

supporting the plates in a removable manner by the conveyor, and providing at each operating station a locking device for locking the plates, which can be activated by a management unit, for stopping at least one plate at a time at the operating station for a predetermined time for manipulation of the capsules and for releasing at least one plate at a time at the end of the manipulation of the capsules.

10. The method according to claim 9, wherein, the number of plates which are stopped by the locking devices at various of the operating stations for subjecting the relative capsules to the manipulations is not the same for all the operating stations to accommodate different time durations for different manipulations performed at different operating stations.

11. The method according to claim 8, and further comprising:

accumulating a group of more than one plate at at least one of the operating stations by stopping in an appropriate position a first plate of the group using a locking device, and then keeping the plate stationary for a time necessary for arrival of at least one further plate of the group, as well as for a time necessary for performance of an operation occurring in the at least one of the operating stations on the capsules supported by plates in the group.

12. The method according to claim 11, and further comprising:

disengaging the locking device to resume moving of the plates, one at a time and in an appropriate number, towards a next operating station.

13. The method according to claim 12, wherein, after the capsules have undergone all manipulations, the capsules are discharged from the plates and then the plates are transported back in succession towards an infeed area of the conveyor.

14. The method according to claim 8, wherein, after the capsules have undergone all manipulations, the capsules are discharged from the plates and then the plates are transported back in succession towards an infeed area of the conveyor.

* * * * *